(12) United States Patent
Wooldridge et al.

(10) Patent No.: US 10,507,677 B2
(45) Date of Patent: Dec. 17, 2019

(54) DUAL CARD TRANSPORT IN A CARD PROCESSING SYSTEM

(71) Applicant: ENTRUST DATACARD CORPORATION, Shakopee, MN (US)

(72) Inventors: Cory D. Wooldridge, Shakopee, MN (US); Timothy J. Flitsch, Shakopee, MN (US); Jon Wawra, Shakopee, MN (US)

(73) Assignee: Entrust Datacard Corporation, Shakopee (*) Notice: Subject to any disclaimer, the term of this patent is extended or adjusted under 35 U.S.C. 154(b) by 0 days.

(21) Appl. No.: 15/974,169

(22) Filed: May 8, 2018

(65) Prior Publication Data
US 2018/0326763 A1 Nov. 15, 2018

Related U.S. Application Data

(60) Provisional application No. 62/503,636, filed on May 9, 2017.

(51) Int. Cl.
*B41J 13/12* (2006.01)
*B41J 2/045* (2006.01)
*B65G 47/91* (2006.01)
*B41J 11/00* (2006.01)
*B41J 11/02* (2006.01)

(52) U.S. Cl.
CPC ............... *B41J 13/12* (2013.01); *B41J 2/045* (2013.01); *B41J 11/002* (2013.01); *B41J 11/0085* (2013.01); *B41J 11/02* (2013.01); *B65G 47/91* (2013.01); *B65G 2201/022* (2013.01)

(58) Field of Classification Search
CPC ........... B41J 13/12; B41J 2/045; B41J 11/002
See application file for complete search history.

(56) References Cited

U.S. PATENT DOCUMENTS

| | | |
|---|---|---|
| 5,094,336 A | 3/1992 | Lundstrom et al. |
| 5,266,781 A | 11/1993 | Warwick et al. |
| 5,451,037 A | 9/1995 | Lundstrom |
| 5,588,763 A | 12/1996 | Nubson et al. |

(Continued)

FOREIGN PATENT DOCUMENTS

WO 2007089965 A1 8/2007

OTHER PUBLICATIONS

International Search Report and Written Opinion issued in PCT/US2018/031597 dated Nov. 5, 2018, 9 pages.

*Primary Examiner* — Jason S Uhlenhake
(74) *Attorney, Agent, or Firm* — Hamre, Schumann, Mueller & Larson, P.C.

(57) ABSTRACT

A card processing system that includes a card transport mechanism having at least first and second separate card transports that separately transport first and second cards in the card processing system. Each of the first and second card transports can be actuated between a common card pick-up location and common card discharge position. At least one card processing mechanism that can perform a card processing operation is located between the common card pick-up location and the common card discharge location, with each of the first and second card transports transporting respective cards to the card processing mechanism to perform the card processing operation and transporting the cards from the card processing mechanism after processing.

15 Claims, 9 Drawing Sheets

(56) References Cited

U.S. PATENT DOCUMENTS

| | | | |
|---|---|---|---|
| 5,632,511 A | 5/1997 | Longtin et al. | |
| 6,170,752 B1 | 1/2001 | Miller | |
| 6,902,107 B2 | 6/2005 | Shay et al. | |
| 2002/0112637 A1* | 8/2002 | Kosaka | B41J 11/002 101/488 |
| 2003/0231948 A1* | 12/2003 | Lien | B32B 37/0053 414/797.7 |
| 2005/0083395 A1 | 4/2005 | Kubota et al. | |

* cited by examiner

DUAL CARD TRANSPORT IN A CARD PROCESSING SYSTEM

FIELD

This disclosure relates to card processing systems that process plastic cards including, but not limited to, financial (e.g., credit, debit, or the like) cards, driver's licenses, national identification cards, business identification cards, gift cards, and other plastic cards, and to transporting cards in such card processing systems.

BACKGROUND

There are many known transport mechanisms for transporting plastic cards in card processing systems. Known card transport mechanisms include rollers and belts. In the case of a card processing system that includes drop-on-demand (DOD) inkjet printing in a DOD printer, one known transport mechanism uses a continuous vacuum belt system where cards are fed onto a vacuum belt at a continuous feed rate with the vacuum belt then delivering the cards past the DOD printer. However, the use of a continuous vacuum belt increases the difficulty of tracking the cards due to the number of cards on the vacuum belt at any one time. Accurate and reliable tracking of the cards throughout their transport is important for many cards including financial cards such as credit and debit cards to help ensure that the correct card is ultimately issued to the correct person. In addition, a continuous vacuum belt as used in the card processing system with DOD inkjet printing can create print quality issues on the cards due to belt stretch or compression, belt tracking, belt oscillations, and belt slippage.

SUMMARY

Systems and methods are described where a card processing system includes a card transport mechanism having at least first and second separate card transports that separately transport first and second cards in the card processing system. Each of the first and second card transports can be actuated between a common card pick-up location and common card discharge position. At least one card processing mechanism that can perform a card processing operation is located between the common card pick-up location and the common card discharge location, with each of the first and second card transports transporting respective cards to the card processing mechanism to perform the card processing operation and transporting the cards from the card processing mechanism after processing.

The cards described herein include, but are not limited to, plastic cards which bear personalized data unique to the intended cardholder and/or which bear other card information. Examples of plastic cards can include, but are not limited to, financial (e.g., credit, debit, or the like) cards, driver's licenses, national identification cards, business identification cards, gift cards, and other plastic cards.

The card processing mechanism(s) described herein can be any card processing mechanism that can perform a processing operation on the cards. Examples of processing mechanisms include, but are not limited to, a printer, an embosser, an indenter, a magnetic stripe read/write head(s), an integrated circuit chip programmer, a laser that performs laser processing such as laser marking on the cards, a laminator that applies a laminate to a portion of or the entire surface of the cards, a topcoat station that applies a topcoat to a portion of or the entire surface of the cards, a quality control station that checks the quality of the personalization/processing applied to the cards, a security station that applies a security feature, such as a holographic foil patch, to the cards, and other card processing mechanisms.

In one embodiment, the card processing mechanism comprises a drop-on-demand (DOD) inkjet printer that performs monochromatic or multi-color printing. When the card processing mechanism is a DOD inkjet printer, the systems and methods described herein eliminate the use of the conventional vacuum belt and the problems created by such a belt. In addition, a card processing mechanism that uses the first and second card transports described herein can achieve a card processing speed up to about 4000 cards per hour or more.

In one specific example implementation, a card processing system can include an integrated circuit chip programming system that can program an integrated circuit chip on a card, a drop-on-demand inkjet printer that can print on the card using ultraviolet ink from at least one printhead, and an ultraviolet curing station positioned to receive cards from the drop-on-demand inkjet printer and that cures ultraviolet ink applied to the cards by the drop-on-demand inkjet printer. The drop-on-demand inkjet printer includes first and second card transports each of which transports cards from a card input of the drop-on-demand inkjet printer, past the at least one printhead, and to a card output of the drop-on-demand inkjet printer, and where the first and second card transports are separately movable relative to one another.

DRAWINGS

DETAILED DESCRIPTION

Figure 1:
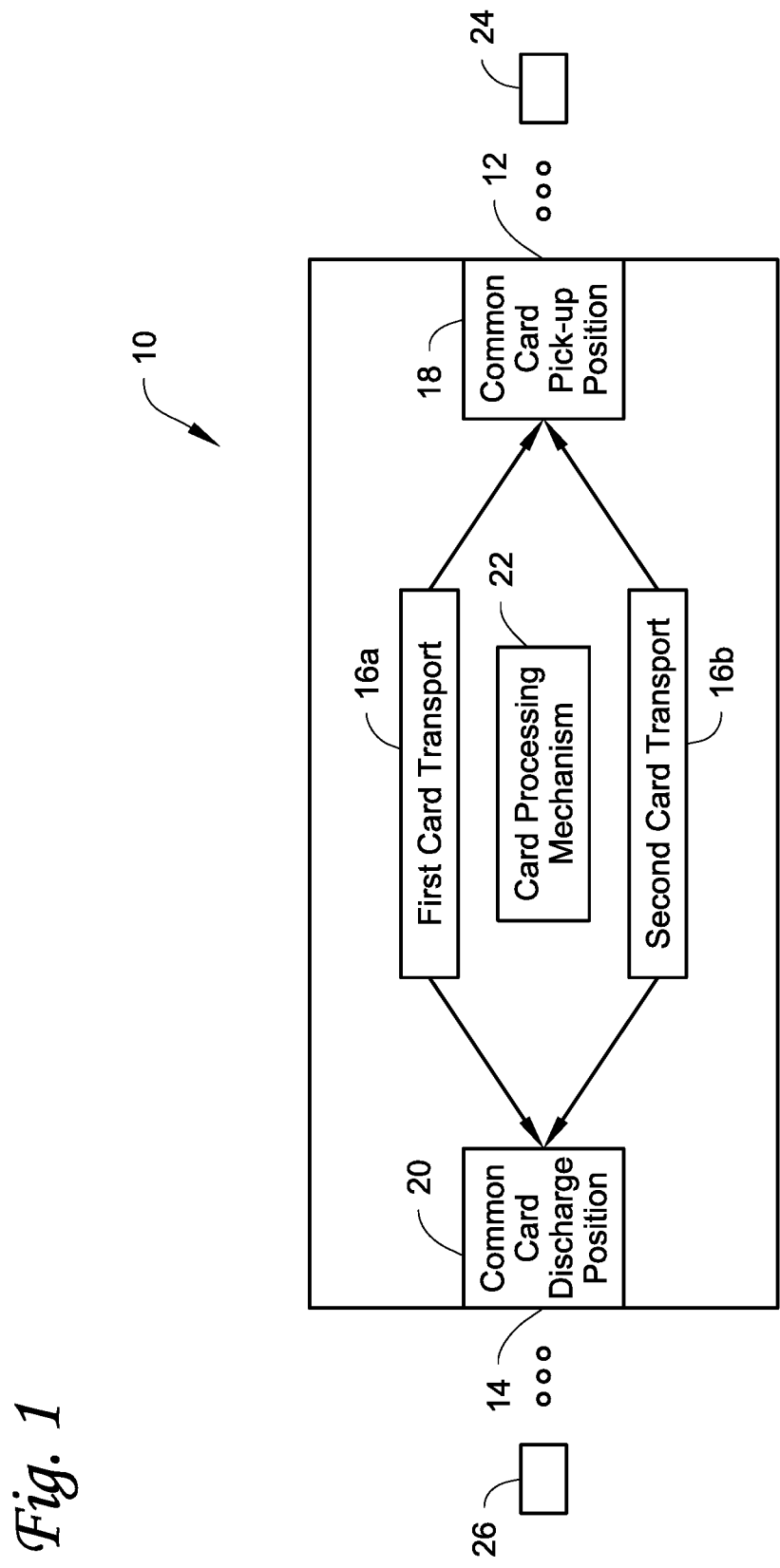
FIG. 1 is a schematic depiction of a card processing system described herein.

FIG. 1 illustrates an example of a card processing system 10 that can utilize the systems and methods described herein. The system 10 may also be referred to as a card processing module or a card processing station. The card processing system 10 includes a card input 12 at one end thereof through which a card can enter the system 10, and a card output 14 at the opposite end through which a card can exit the system 10. The card input 12 and the card output 14 can take any form suitable for allowing cards to enter and exit the system 10, for example input and output slots. The system 10 further includes a card transport mechanism that transports cards from the card input 12 to the card output 14. In some embodiments, the card transport mechanism may also transport cards back toward the card input 12. The card transport mechanism has at least first and second separate card transports 16a, 16b (or first and second card transport means 16a, 16b) each of which can receive a card from the card input 12, support the card as the card is transported in the system 10, and ultimately deliver the card to the card output 14. Although the card transport mechanism is illustrated as having the two card transports 16a, 16b, additional card transports can be provided as well.

Still referring to FIG. 1, a common card pick-up position 18 is defined near or adjacent to the card input 12, while a common card discharge position 20 is defined near or adjacent to the card output 14. The common card pick-up position 18 and the common card discharge position 20 are locations in the system 10 that permit each of the card transports 16a, 16b to be separately positioned at separate times at the same location in the system to pick-up cards that are input via the card input 12 and to deliver the cards to the card output 14 for discharge of the cards. So the word common in the common card pick-up position 18 and the common card discharge position 20 refers to the situation where the card transports 16a, 16b can each occupy the same space in the system 10, but at different times, and the card transport mechanism is suitably designed to actuate the card transports 16a, 16b between the common card pick-up position 18 and the common card discharge position 20 without the card transports 16a, 16b interfering with one another.

Each of the card transports 16a, 16b are separately actuatable to separately occupy the common card pick-up position 18 to pick up cards that are input via the card input 12, as well as being separately actuatable to separately occupy the common card discharge position 20 to deliver cards to the card output 14. In addition to being actuatable to the common card pick-up position 18 and to the common card discharge position 20, the first and second card transports 16a, 16b are each separately actuatable to move back and forth between the common card pick-up position 18 and the common card discharge position 20. The card transports 16a, 16b can have any configuration suitable for picking up, transporting and discharging cards in this manner. Non-limiting examples of the card transports 16a, 16b are described below with respect to FIGS. 2-9.

In one embodiment, when the card transport 16a is at the common card pick-up position 18 picking up a card, the card transport 16b is at the common card discharge position 20 discharging a card. Likewise, when the card transport 16b is at the common card pick-up position 18 picking up a card, the card transport 16a is at the common card discharge position 20 discharging a card. In this embodiment, the card transports 16a, 16b cycle back and forth between the common card pick-up position 18 and the common card discharge position 20 via a card processing mechanism 22 discussed below.

The path the card transport 16a, 16b follows as it travels from the common card pick-up position 18, through the card processing mechanism 22, and to the common card discharge position 20 can be referred to as a card processing path. The path the card transport 16a, 16b follows as it travels from the common card discharge position 20 back to the common card pick-up position 18, preferably bypassing the card processing mechanism 22, can be referred to as a return path. The card processing path is generally parallel to the return path. In one embodiment, the card processing path can be vertically above the return path. In other embodiments, the card processing path can be vertically below the return path, or the card processing path and the return path can be displaced horizontally or laterally from one another.

As shown in FIG. 1, the card processing mechanism 22 is arranged between the card input 12 and the card output 14, as well as between the common card pick-up position 18 and the common card discharge position 20, and is disposed along the card processing path of the card transports 16a, 16b so that the card transports 16a, 16b can transport cards to the card processing mechanism 22 for processing of the cards and transport cards from the card processing mechanism 22 to the card output 14. The card processing mechanism 22 can be any card processing mechanism that can perform a processing operation on the cards. Examples of processing mechanisms include, but are not limited to, a printer, an embosser, an indenter, a magnetic stripe read/write head(s), an integrated circuit chip programmer, a laser that performs laser processing such as laser marking on the cards, a laminator that applies a laminate to a portion of or the entire surface of the cards, a topcoat station that applies a topcoat to a portion of or the entire surface of the cards, a quality control station that checks the quality of the personalization/processing applied to the cards, a security station that applies a security feature, such as a holographic foil patch, to the cards, and other processing mechanisms. In one embodiment discussed further below, the card processing mechanism 22 can be a DOD inkjet printer.

In operation of the system 10, a card is input via the card input 12 and is picked-up at the common card pick-up position 18 by the card transport 16a. The card transport 16a transports the card to the card processing mechanism 22 which performs a processing operation on the card. After processing, the card transport 16a transports the card to the common card discharge position 20 and the processed card is discharged through the card output 14. As the card transport 16a is transporting the card from the common card pick-up position 18, the card transport 16b is actuated from the common card discharge position 20 toward the common card pick-up position 18. The card transport 16b bypasses the card processing mechanism 22, for example by traveling underneath, above or to the side of the card processing mechanism 22, and eventually reaches the common card pick-up position 18 as the card transport 16a reaches the common card discharge position 20. The card transport 16b picks-up a card that is input via the card input 12 and begins to transport the card to the card processing mechanism 22 to perform a processing operation on the card. After processing, the card transport 16b transports the card to the common card discharge position 20 and the processed card is discharged through the card output 14. At the same time, the card transport 16a is actuated back toward the common card pick-up position 18, bypassing the card processing mechanism 22. This cycle repeats continuously, with two cards in the system 10 at any one time, one card being picked-up by one of the card transports 16a, 16b and the second card being discharged by the other card transport 16a, 16b.

As illustrated in FIG. 1, in some embodiments the system 10 can be used with one or more other card processing systems (also referred to as card processing modules or card processing stations). For example, one or more additional card processing systems 24 can be located upstream of the system 10. Examples of the upstream card processing system(s) 24 can include, but are not limited to, one or more of a card input hopper containing cards to be processed, a printing system, an embossing system, an indenting system, a magnetic stripe reading/writing system, an integrated circuit chip programming system, a laser system that performs laser processing such as laser marking on the cards, a laminating system that applies a laminate to a portion of or the entire surface of the cards, a topcoat system that applies a topcoat to a portion of or the entire surface of the cards, a security system that applies a security feature, such as a holographic foil patch, to the cards, and other systems known in the art.

One or more additional card processing systems 26 can also be located downstream of the system 10. Examples of the downstream card processing system(s) 26 can include, but are not limited to, one or more of a card output hopper containing cards that have been processed, a UV curing station, a printing system, an embossing system, an indenting system, a magnetic stripe reading/writing system, an integrated circuit chip programming system, a laser system that performs laser processing such as laser marking on the cards, a laminating system that applies a laminate to a portion of or the entire surface of the cards, a topcoat system that applies a topcoat to a portion of or the entire surface of the cards, a security system that applies a security feature, such as a holographic foil patch, to the cards, and other systems known in the art.

Figure 2:
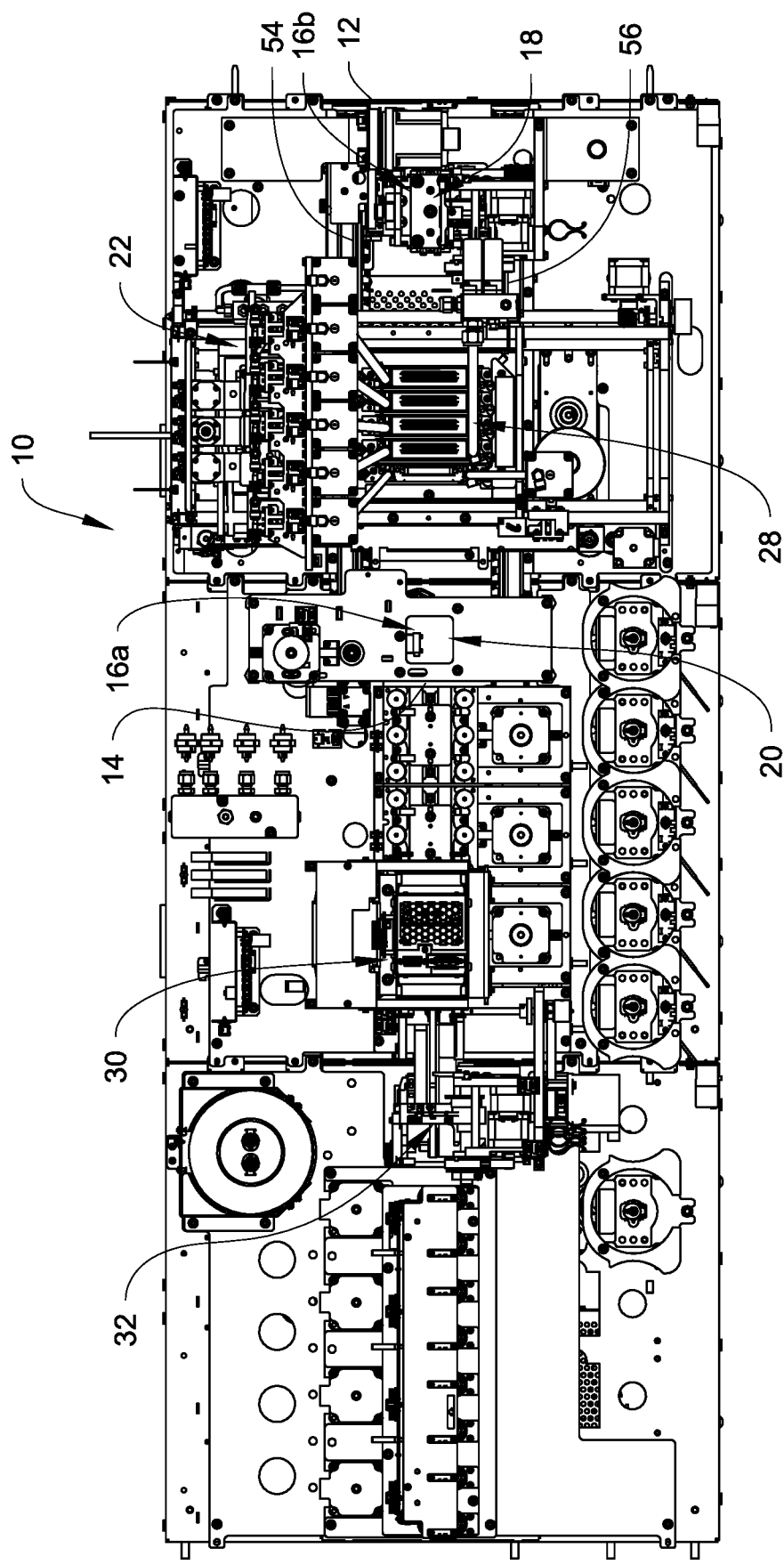
FIG. 2 is a top view of one example of a card processing system described herein.

Turning to FIG. 2, a specific example of the card processing system 10 is illustrated. In this example, the card processing mechanism 22 is illustrated as a DOD inkjet printer. The inkjet printer can have a single printhead that prints a single color, or as illustrated a plurality of printheads 28 to print multiple colors on the cards. The card transport 16*b* is illustrated at the common card pick-up position 18 to pick-up a card that has been input via the card input 12. In this example, the card enters the card input 12 in a vertical orientation (i.e. the plane of the card extends vertically into and out of the paper as seen from the top view in FIG. 2) and is rotated to a horizontal orientation at the common card pick-up position 18, with the card being transported by the card transport 16*b* in the horizontal orientation while in the system 10. The card transport 16*a* is shown at the common card discharge position 20 discharging a card through the card output 14. The card transport 16*a* is then cycled back to the common card pick-up position 18 while the card transport 16*b* transports its card to and through the card processing mechanism 22 and ultimately to the common card discharge position 20.

FIG. 2 illustrates that the system 10 can be used with a UV curing station 30 located downstream from the system 10 or downstream from the printhead(s) 28. A card that is printed on is transported to the UV curing station 30 which cures UV ink applied to the card surface by the DOD inkjet printer. After curing, the card is transported to a rotation mechanism 32 which rotates the card back to a vertical orientation for further processing downstream of the card. If the card processing mechanism 22 is not a DOD inkjet printer, then the UV curing station 30 is not required. In addition, the UV curing station 30 can be located at a position so that the UV curing occurs after the card has been rotated back to the vertical orientation. In addition, in some embodiments, the card need not be rotated back to the vertical orientation at all.

Referring to FIGS. 3-6, a first embodiment of a card transport mechanism 50 for transporting cards within the system 10 is illustrated. In this embodiment, the first card transport 16*a* and the second card transport 16*b* are each in the form of a vacuum platen 52. For sake of convenience, cards 84 are shown (in transparent) on the vacuum platens 52 of the first and second card transport 16*a*, 16*b*. Each vacuum platen 52 is configured to apply a vacuum to a card disposed thereon, much like a conventional vacuum belt, to retain the card in position on the platen 52 during transport and during processing in the card processing mechanism 22.

The card transport mechanism 50 includes a pair of parallel rails 54, 56 that extend longitudinally in the card transport direction parallel to the card processing path and to the return path from generally one end of the system 10 to the other end. The card transport mechanism 50 is a two axis or an X-Y axis transport system where each of the vacuum platens 52 is actuatable along the X and Y axes in FIG. 3. In particular, a longitudinal shuttle 58, 60 is slidably disposed on each rail 54, 56 for movement along the length of each rail 54, 56 in an X-axis direction actuated by drive motors 62, 64 that are in driving engagement with the longitudinal shuttles 58, 60 via suitable drive mechanisms. In addition, a vertical rail 66, 68 is mounted on each shuttle 58, 60 and a vertical shuttle 70, 72 is slidably disposed on each vertical rail 66, 68 for movement along the length of each vertical rail 66, 68 in a Y-axis direction actuated by drive motors 74, 76 that are in driving engagement with the vertical shuttles 70, 72 via suitable drive mechanisms. The vacuum platens 52 are fixed to and move with the vertical shuttles 70, 72.

Figure 3:
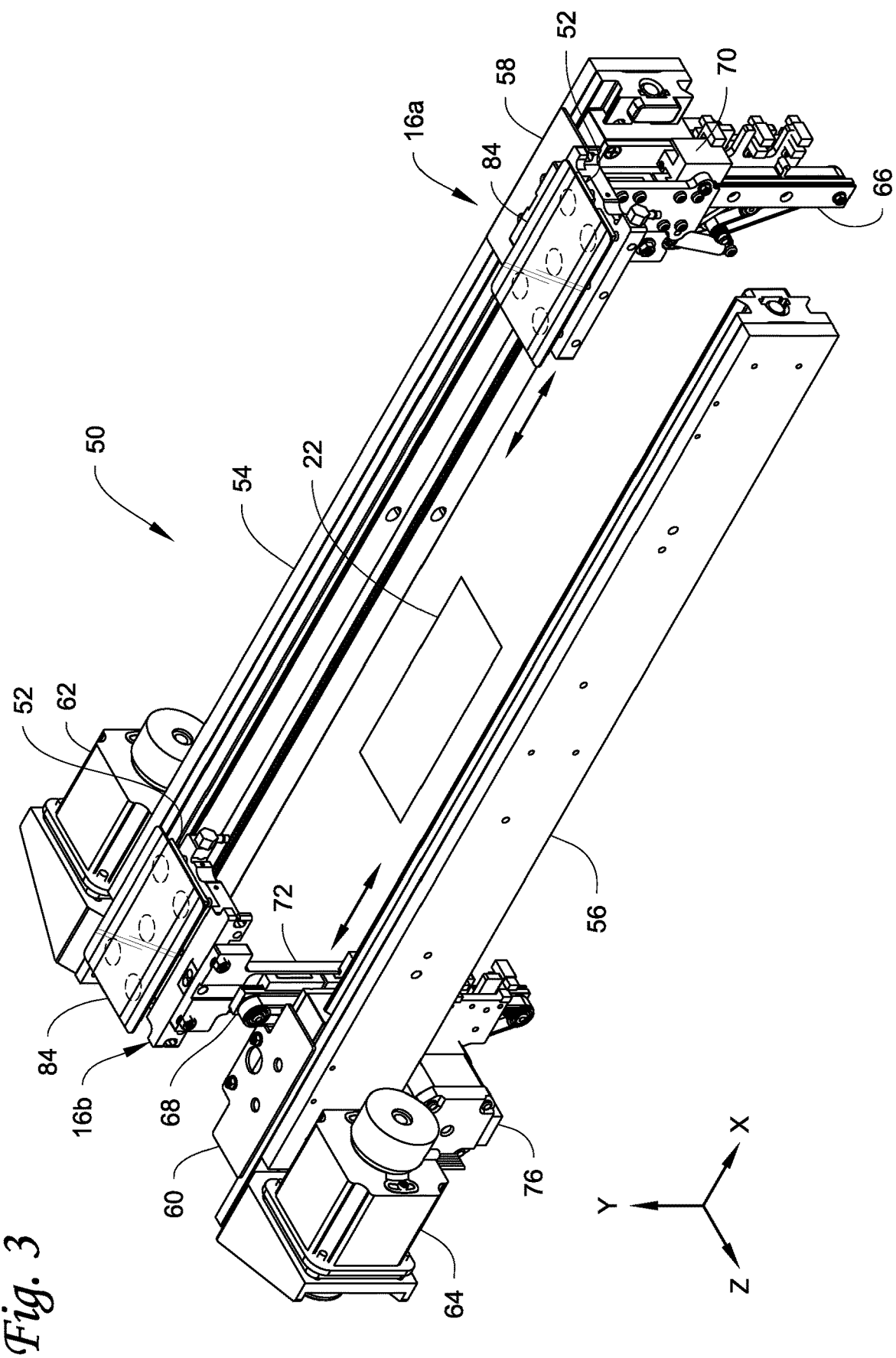
FIG. 3 is a perspective view of one embodiment of a card transport mechanism described herein.

FIG. 3 illustrates the platens 52 of the card transports 16*b*, 16*a* at an elevated position at the common card pick-up position and at the common card discharge position, respectively. At these positions, the platens 52 are ready to pick-up a card for processing and to discharge a processed card, respectively.

Figure 4:
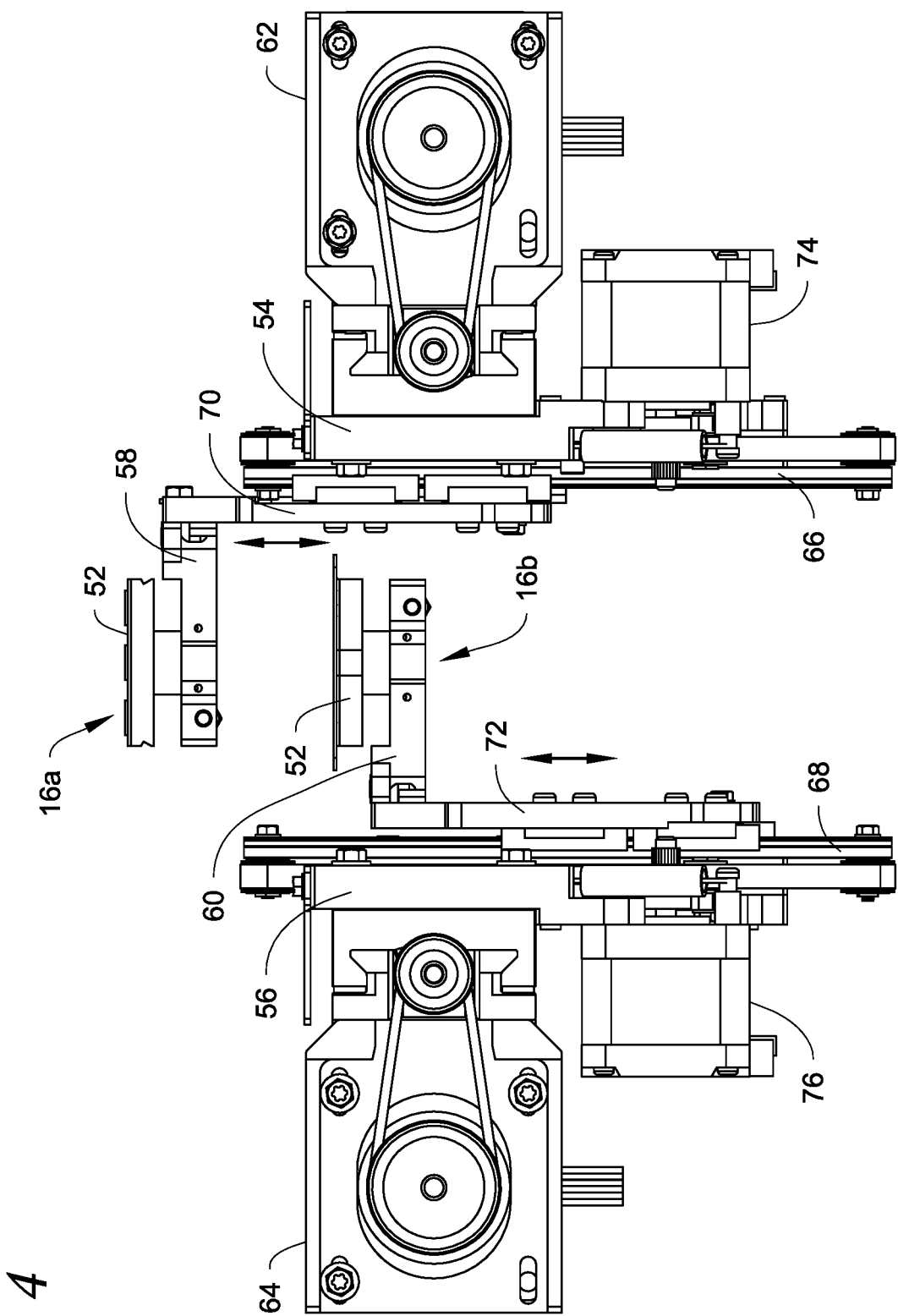
FIG. 4 is an end view of the card transport mechanism of FIG. 3.

FIG. 4 shows the platen 52 of the card transport 16*a* still at the elevated position after having picked-up a card at the common card pick-up position and transporting the card toward the card processing mechanism 22. At the same time, the platen 52 of the card transport 16*b* has been vertically lowered. This allows the card transport 16*b* to pass underneath or bypass the card processing mechanism 22, as well as pass underneath the card transport 16*a*, as the card transport 16*b* is actuated back to the common card pick-up position to pick-up a new card.

Figure 5:
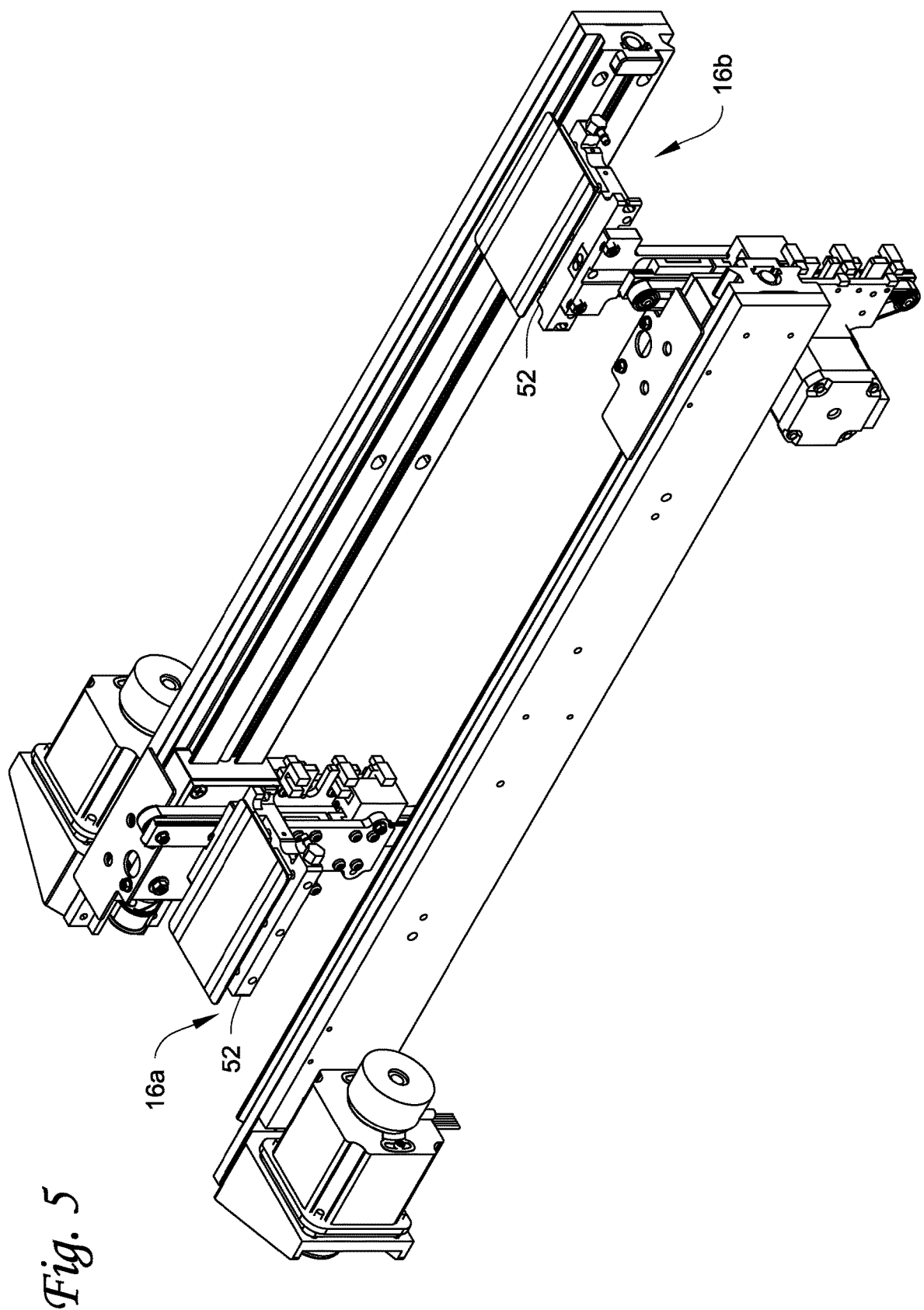
FIG. 5 is a perspective view similar to FIG. 3 but showing a first card transport vertically lowered relative to a second card transport.
Figure 6:
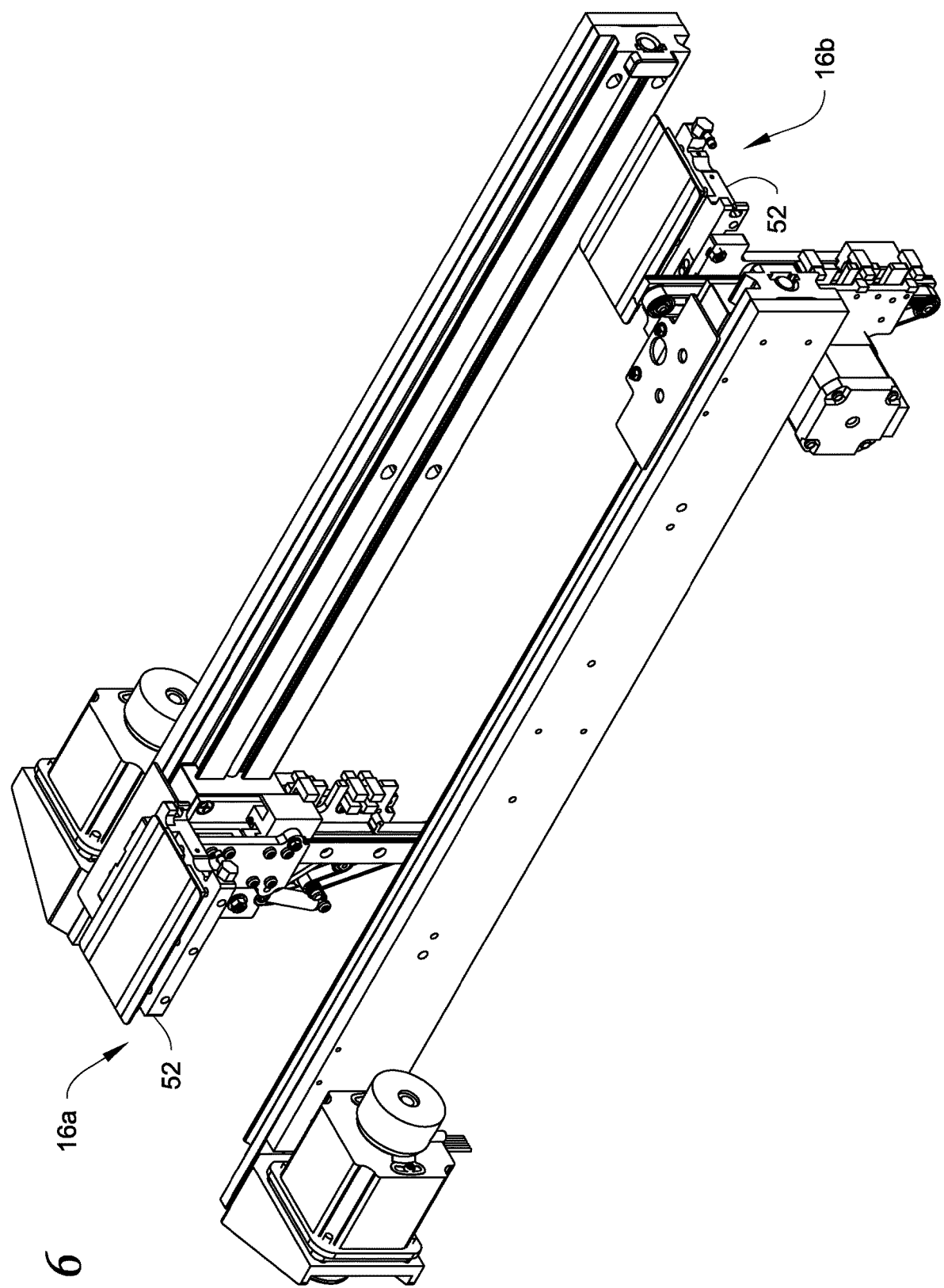
FIG. 6 is a perspective view similar to FIG. 5 but showing the second card transport vertically lowered relative to the first card transport.

FIG. 5 illustrates the platen 52 of the card transport 16*a* vertically lowered after discharging a processed card (the card shown on the platen 52 of the card transport 16*a* of FIG. 5 would not be present after discharging the card) and ready for actuation back to the common card pick-up position, and the platen 52 of the card transport 16*b* being vertically raised ready to pick-up a card at the common card pick-up position (a card is shown on the platen 52 of the card transport 16*b*). FIG. 6 is somewhat similar to FIG. 5 but illustrates the platen 52 of the card transport 16*a* at the vertically raised position at the common card discharge position ready to discharge a card after processing, and the platen 52 of the card transport 16*b* at a vertically lowered position after having been actuated back and prior to being vertically raised to pick-up a card at the common card pick-up position (the card shown on the platen 52 of the card transport 16*b* of FIG. 6 would not actually be present until the platen is raised up to a position to pick up the card).

The vacuum platens 52 can have any configuration suitable for applying a vacuum to the cards to retain the cards on the platens. Referring to FIGS. 3-7, each of the vacuum platens 52 can have a plurality of holes 80 therein, such as four corner holes 80 and one central hole 80 (best seen in FIG. 7). The holes are in communication with a vacuum source that applies a vacuum to the holes 80 which act on the facing card surface to retain the cards on the platens 52. However, other configurations and patterns of holes can be used.

Figure 7:
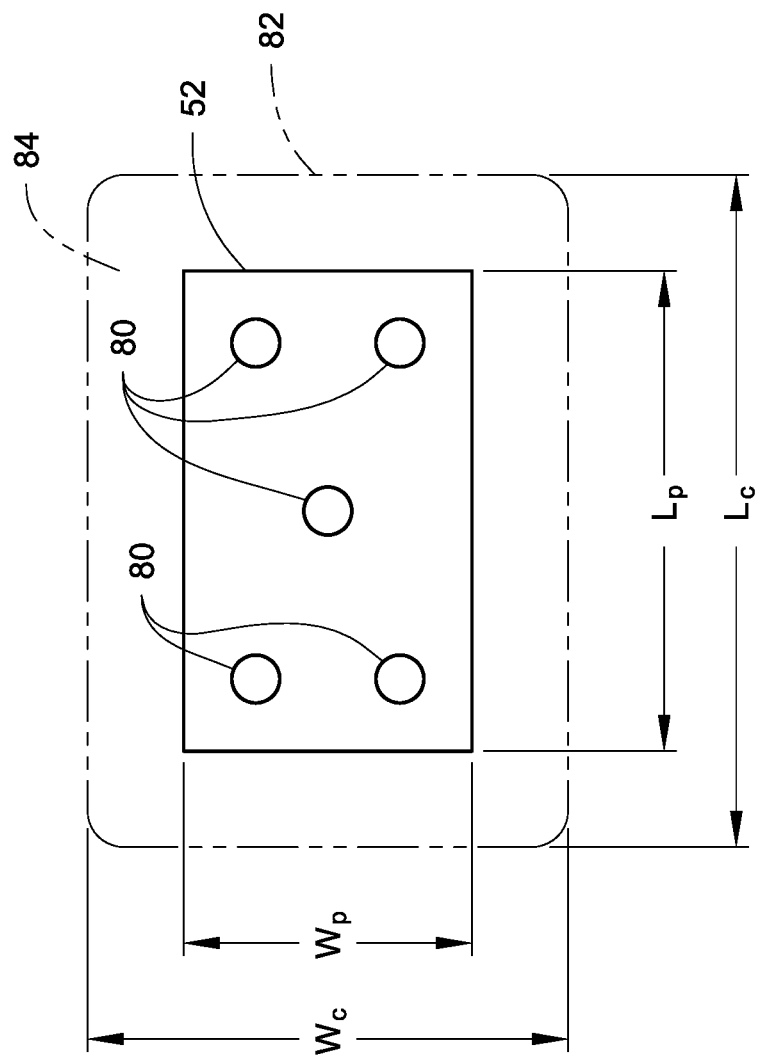
FIG. 7 is a top view that illustrates a size relationship between a card and one of the card transports.

In one embodiment, the size of the platens 52 is smaller than the size of the cards. Referring to FIG. 7, one of the platens 52 is illustrated in solid lines, while a perimeter edge 82 of the card 84 is illustrated in broken lines. The card 84 overhangs the platen 52 such that there is a gap between the perimeter edge of the platen 52 and the perimeter edge 82 of the card 84. In one embodiment, the plastic card 84 can be an ID-1 card as defined by ISO/IEC 7810, with a length $L_c$, of about 85.60 mm (about 3⅜ inches) and a width $W_c$ of about 53.98 mm (about 2-⅛ inches), and rounded corners with a radius of between about 2.88-3.48 mm. Each vacuum platen 52 has a length $L_p$ that is less than about 85.60 mm and a width $W_p$ less than about 53.98 mm. Providing the overhang between the perimeter edge 82 of the card 84 and the platen 52 is especially useful when the card processing mechanism 22 is a DOD inkjet printer. Because of the overhang, spray from the DOD inkjet printer that misses the card surface does not fall on the platen 52. However, when the card processing mechanism 22 is not a DOD inkjet printer, the overhang may not be used and the vacuum platens 52 can have a size that is larger than the size of the cards 84.

Figure 8:
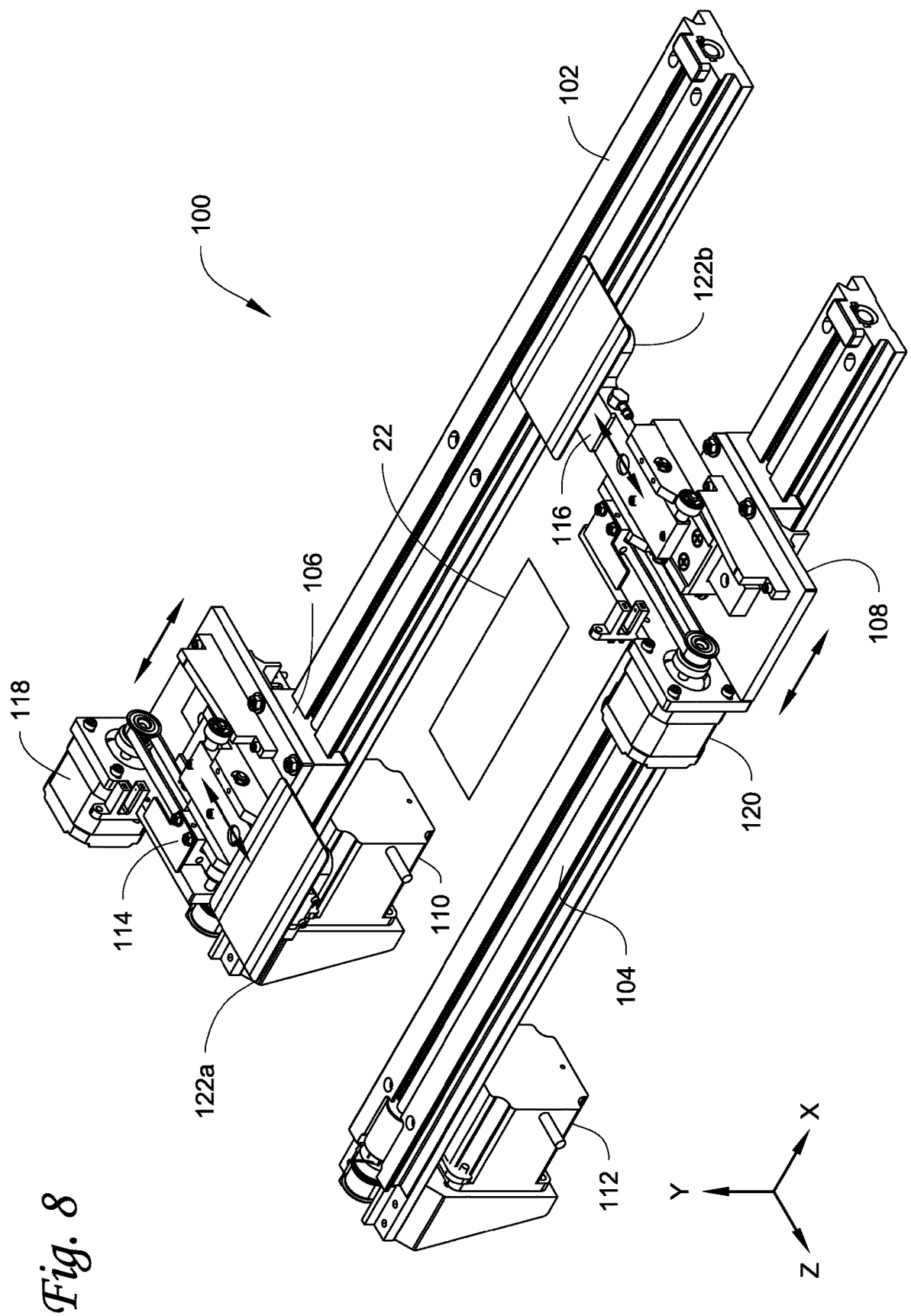
FIG. 8 is a perspective view of another embodiment of a card transport mechanism described herein.

FIG. 8 illustrates another embodiment of a card transport mechanism 100. In this embodiment, the mechanism 100 includes a pair of parallel rails 102, 104 that extend longitudinally in the card transport direction parallel to the card processing path and to the return path from generally one end of the system to the other end. A longitudinal shuttle 106, 108 is slidably disposed on each rail 102, 104 for movement along the length of each rail 102, 104 in an X-axis direction actuated by drive motors 110, 112 that are in driving engagement with the longitudinal shuttles 106, 108 via suitable drive mechanisms. In addition, a horizontal shuttle 114, 116 is slidably mounted on each shuttle 106, 108 for movement in a Z-axis direction relative to the shuttles 106, 108 actuated by drive motors 118, 120 that are in driving engagement with the shuttles 114, 116 via suitable drive mechanisms. First and second card transports 122a, 122b, such as vacuum platens, are fixed to and move horizontally with the shuttles 114, 116.

In operation of FIG. 8, the card transport 122b is shown at the common card pick-up position picking up a card while the card transport 122a is shown at the common card discharge position discharging a processed card that has been transported through and processed in the card processing mechanism 22. The card transport 122b is then actuated in the X-axis direction along the card processing path to transport the card to and through the card processing mechanism 22 for processing and ultimately to the common card discharge position. At the same time, the card transport 122a is retracted horizontally in the Z-axis direction by the shuttle 114. This retraction allows the card transport 122a to bypass the card processing mechanism 22, and avoid the card transport 122b as the card transport 122a is actuated by the shuttle 106 along the return path back to the common card pick-up position to pick-up a new card. In this embodiment, the card processing path and the return path are parallel to one another but displaced horizontally or laterally from one another so that the card transports 122a, 122b pass to the side of the card processing mechanism 22 on the return path.

Figure 9:
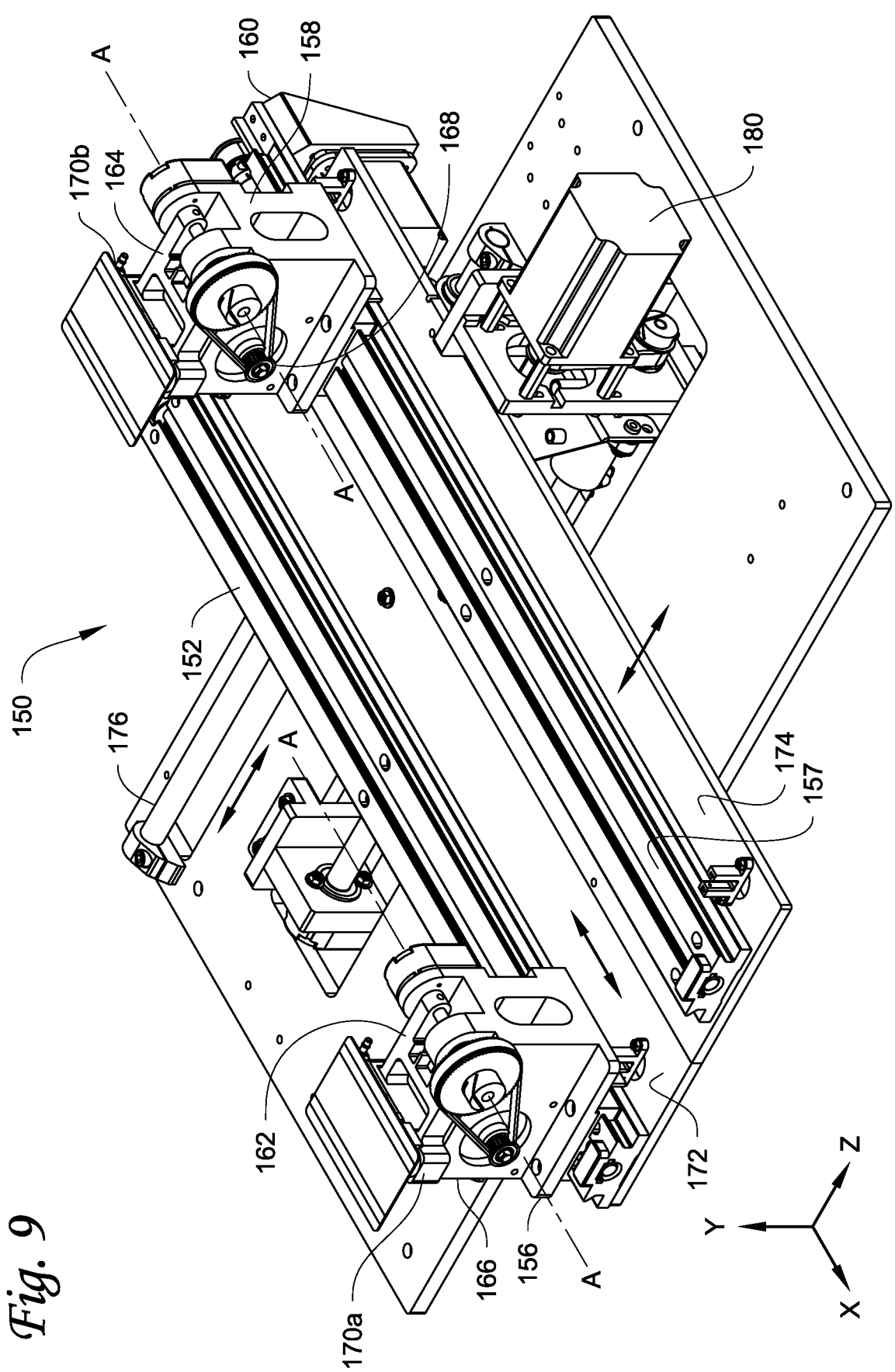
FIG. 9 is a perspective view of still another embodiment of a card transport mechanism described herein.

FIG. 9 illustrates another embodiment of a card transport mechanism 150. In this embodiment, the mechanism 150 includes a pair of parallel rails 152, 154 that extend longitudinally in the card transport direction parallel to the card processing path and to the return path from generally one end of the system to the other end. A longitudinal shuttle 156, 158 is slidably disposed on each rail 152, 154 for movement along the length of each rail 152, 154 in an X-axis direction actuated by drive motors 160 (only one drive motor is visible in FIG. 9) that are in driving engagement with the longitudinal shuttles 156, 158 via suitable drive mechanisms. In addition, a rotatable arm 162, 164 is rotatably mounted on each shuttle 156, 158 for rotational movement about a rotation axis A each of which is parallel to the rails 152, 154 and parallel to the X-axis direction. The rotation of the arms 162, 164 is caused by drive motors 166, 168 that are in driving engagement with pivot axes of the arms 162, 164 via suitable drive mechanisms.

First and second card transports 170a, 170b, such as vacuum platens, are fixed to and rotate with the arms 162, 164. Each rail 152, 154 is mounted on a plate 172, 174 that are slidable on a rail 176 in the Z-axis direction, actuated by a drive motor 180.

In operation of FIG. 9, the card transport 170b is shown at the common card pick-up position picking up a card while the card transport 170a is shown returning along the return path from the common card discharge position after having discharged a processed card that has been transported through and processed in the card processing mechanism 22. When picking-up a card, the arms 162, 164 are rotated to a vertical position so that the card transports 170a, 170b are vertical to pick-up a vertically oriented card input through the card input. After picking up a card, the arms 162, 164 are then rotated back to horizontal during transport and processing by the card processing mechanism. The card transport 170b is then actuated in the X-axis direction along the card processing path to transport the card to and through the card processing mechanism 22 for processing and ultimately to the common card discharge position. At the same time, the plates 172, 174 are moved horizontally in the Z-axis direction which shifts the rail 152 laterally and the arm 162 is rotated to the position shown in FIG. 9. The movement of the plate 172 and the rotation of the arm 162 allow the card transport 170a to bypass the card processing mechanism 22 and avoid the card transport 170b as the card transport 170a is actuated by the shuttle 156 along the return path back to the common card pick-up position to pick-up a new card. Once the card transport 170b reaches the common card discharge position, the plates 172, 174 are moved horizontally and the arm 164 rotated to bring the processed card back to vertical, and the arm 162 rotated to bring the card transport 170 to the common card pick-up position. In this embodiment, the card processing path and the return path are parallel to one another, but are displaced horizontally or laterally from one another so that the card transports 170a, 170b pass to the side of the card processing mechanism 22 on the return path.

The systems and mechanisms described herein can be can be part of a central issuance card system that is often room sized, configured with multiple personalization/processing stations or modules simultaneously performing different personalization/processing tasks on cards, and that is generally configured to process multiple cards at once in relatively high processing volumes (for example, on the order of hundreds or thousands per hour). An example of a central issuance system is the MX and MPR line of card issuance systems available from Entrust Datacard Corporation of Shakopee, Minn. Central issuance systems are described in U.S. Pat. Nos. 6,902,107, 5,588,763, 5,451,037, and 5,266,781 which are incorporated by reference herein in their entirety.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A card processing system, comprising:
   a card input;
   a card output opposite the card input;
   a card processing mechanism between the card input and the card output, the card processing mechanism is configured to perform a processing operation on a card that is input through the card input;
   a card transport mechanism that transports cards from the card input, through the card processing mechanism and to the card output, the card transport mechanism includes first and second separately movable card transports each of which is configured to support a respective card thereon; and
   the first and second separately movable card transports are each separately actuatable to occupy a common card pick-up position adjacent to the card input and occupy a common card discharge position adjacent to the card output, and the first and second separately movable card transports are each separately actuatable to move between the common card pick-up position and the common card discharge position.

2. The card processing system of claim 1, wherein the card processing mechanism comprises a drop-on-demand inkjet printer.

3. The card processing system of claim 1, wherein each of the first and second separately movable card transports comprises a vacuum platen.

4. The card processing system of claim 3, wherein each vacuum platen has a length less than about 85.60 mm and a width less than about 53.98 mm.

5. A card processing system, comprising:
   a card input;
   a card output opposite the card input;
   a card processing mechanism between the card input and the card output, the card processing mechanism is configured to perform a processing operation on a card that is input through the card input, and the card processing mechanism includes a drop-on-demand inkjet printer;
   a card transport mechanism that transports cards from the card input, through the card processing mechanism and to the card output, the card transport mechanism includes first and second separately movable card transports each of which is configured to support a respective card thereon; and
   wherein the drop-on-demand inkjet printer prints using ultraviolet ink from at least one printhead, and the first and second separately movable card transports are each configured to transport the respective card from the card input past the at least one printhead.

6. The card processing system of claim 5, further comprising:
   an integrated circuit chip programming system that can program an integrated circuit chip on a card, the integrated circuit chip programming system is located upstream from or downstream from the drop-on-demand inkjet printer; and
   an ultraviolet curing station positioned to receive cards from the drop-on-demand inkjet printer, the ultraviolet curing station cures ultraviolet ink applied to the cards by the drop-on-demand inkjet printer.

7. A card processing system, comprising:
   a card input;
   a card output;
   at least one card processing mechanism between the card input and the card output, the at least one card processing mechanism is configured to perform a processing operation on a card;
   first and second card transport means each of which transports cards from the card input, past the at least one card processing mechanism and to the card output, the first and second card transport means are separately movable relative to one another and each of the first and second card transport means can support a respective card thereon; and
   the first and second card transport means are each separately actuatable to occupy a common card pick-up position adjacent to the card input and occupy a common card discharge position adjacent to the card output, and the first and second card transport means are each separately actuatable to move between the common card pick-up position and the common card discharge position.

8. The card processing system of claim 7, wherein the at least one card processing mechanism comprises a drop-on-demand inkjet printer.

9. The card processing system of claim 7, wherein each of the first and second card transport means comprises a vacuum platen on which the respective card is supported.

10. The card processing system of claim 9, wherein each vacuum platen has a length less than about 85.60 mm and a width less than about 53.98 mm.

11. A card processing system, comprising:
    a card input;
    a card output;
    at least one card processing mechanism between the card input and the card output, the at least one card processing mechanism is configured to perform a processing operation on a card, and the at least one card processing mechanism comprises a drop-on-demand inkjet printer;
    first and second card transport means each of which transports cards from the card input, past the at least one card processing mechanism and to the card output, the first and second card transport means are separately movable relative to one another and each of the first and second card transport means can support a respective card thereon; and
    wherein the drop-on-demand inkjet printer prints using ultraviolet ink from at least one printhead, and the first and second card transport means are each configured to transport a card from the card input past the at least one printhead.

12. The card processing system of claim 11, further comprising:
    an integrated circuit chip programming system that can program an integrated circuit chip on a card, the integrated circuit chip programming system is located upstream from or downstream from the drop-on-demand inkjet printer; and
    an ultraviolet curing station positioned to receive cards from the drop-on-demand inkjet printer, the ultraviolet curing station cures ultraviolet ink applied to the cards by the drop-on-demand inkjet printer.

13. A card transport mechanism that transports cards within a card processing system, the card transport mechanism comprising:
    a first card transport and a second card transport within the card processing system, the first and second card transports are movable relative to one another;

the first and second card transports are each separately actuatable to occupy a common card pick-up position and occupy a common card discharge position, and the first and second card transports are each separately actuatable to move between the common card pick-up position and the common card discharge position.

14. The card transport mechanism of claim 13, wherein each of the first and second card transports comprises a vacuum platen.

15. The card transport mechanism of claim 14, wherein each vacuum platen has a length less than about 85.60 mm and a width less than about 53.98 mm.

* * * * *